United States Patent

[11] 3,592,355

| [72] | Inventors | Marvin R. Manzer;<br>Donald E. Schmitt, both of Rockford, Ill. |
|---|---|---|
| [21] | Appl. No. | 883,197 |
| [22] | Filed | Dec. 8, 1969 |
| [45] | Patented | July 13, 1971 |
| [73] | Assignee | Reed Electromech Corp.<br>Rockford, Ill. |

[54] DISPENSING DEVICE WITH ROTATABLE TURRET
12 Claims, 11 Drawing Figs.

[52] U.S. Cl. ................................................. 221/11,
221/104
[51] Int. Cl. .................................................... G07f 11/12
[50] Field of Search ........................................ 221/310,
221, 222, 223, 11, 104

[56] References Cited
UNITED STATES PATENTS

| 2,925,196 | 2/1960 | Stoner | 221/11 X |
| 3,120,324 | 2/1964 | Amberg et al. | 221/11 X |

Primary Examiner—Stanley H. Tollberg
Attorney—Wolfe, Hubbard, Voit & Osann

ABSTRACT: A positive acting mechanism for backing up a rotating turret of a cup dispenser to place one of the cupholders on the turret in registry with a dispensing opening in the base of the dispenser after the turret has been indexed to move the holder toward and then partially past the opening. The forward indexing of the turret allows the lowermost cups of a stack of nested cups in the holder to drop into the opening, and the backing up of the turret shifts the cups stacked in the holder into accurate alignment with the cups dropped into the opening.

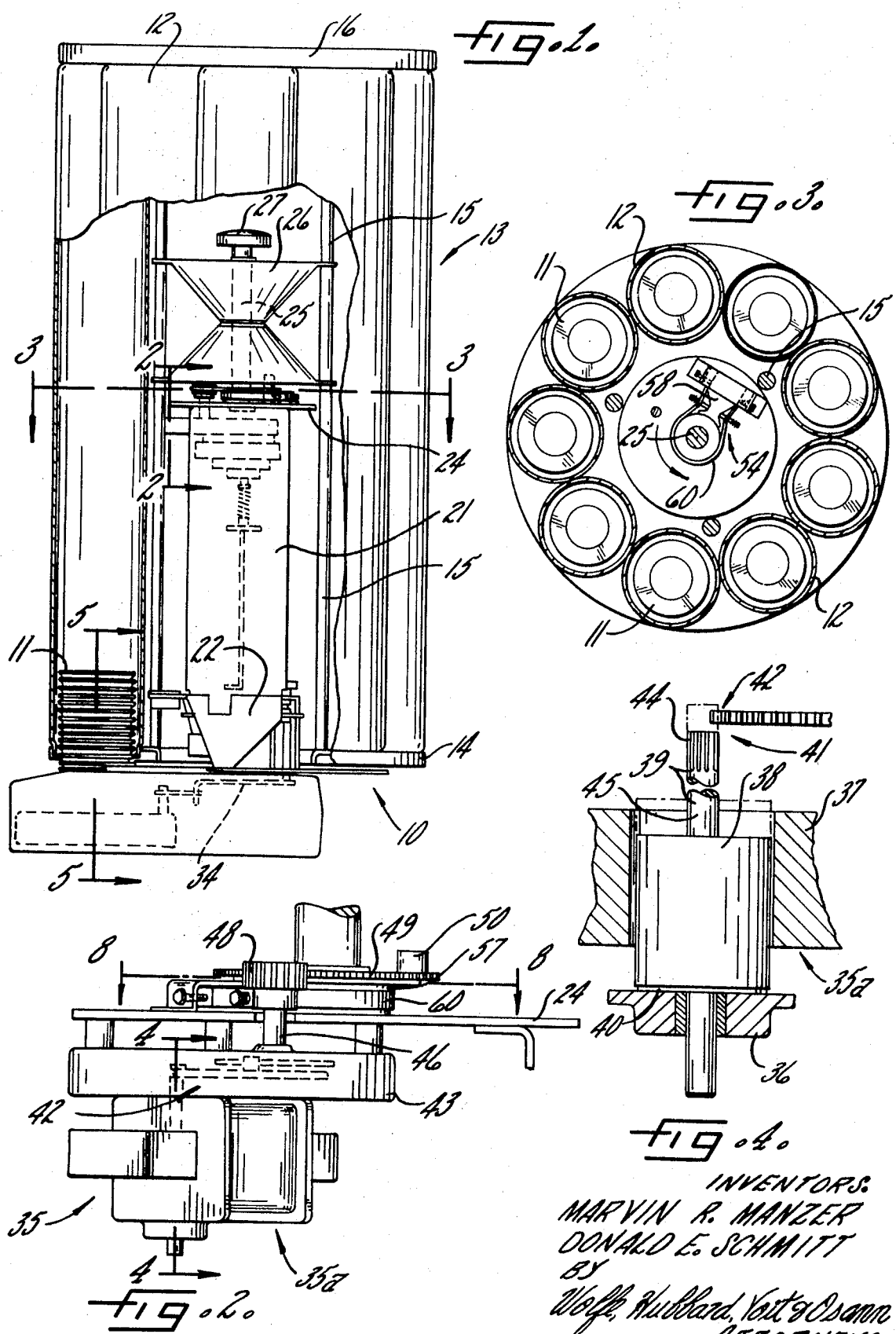

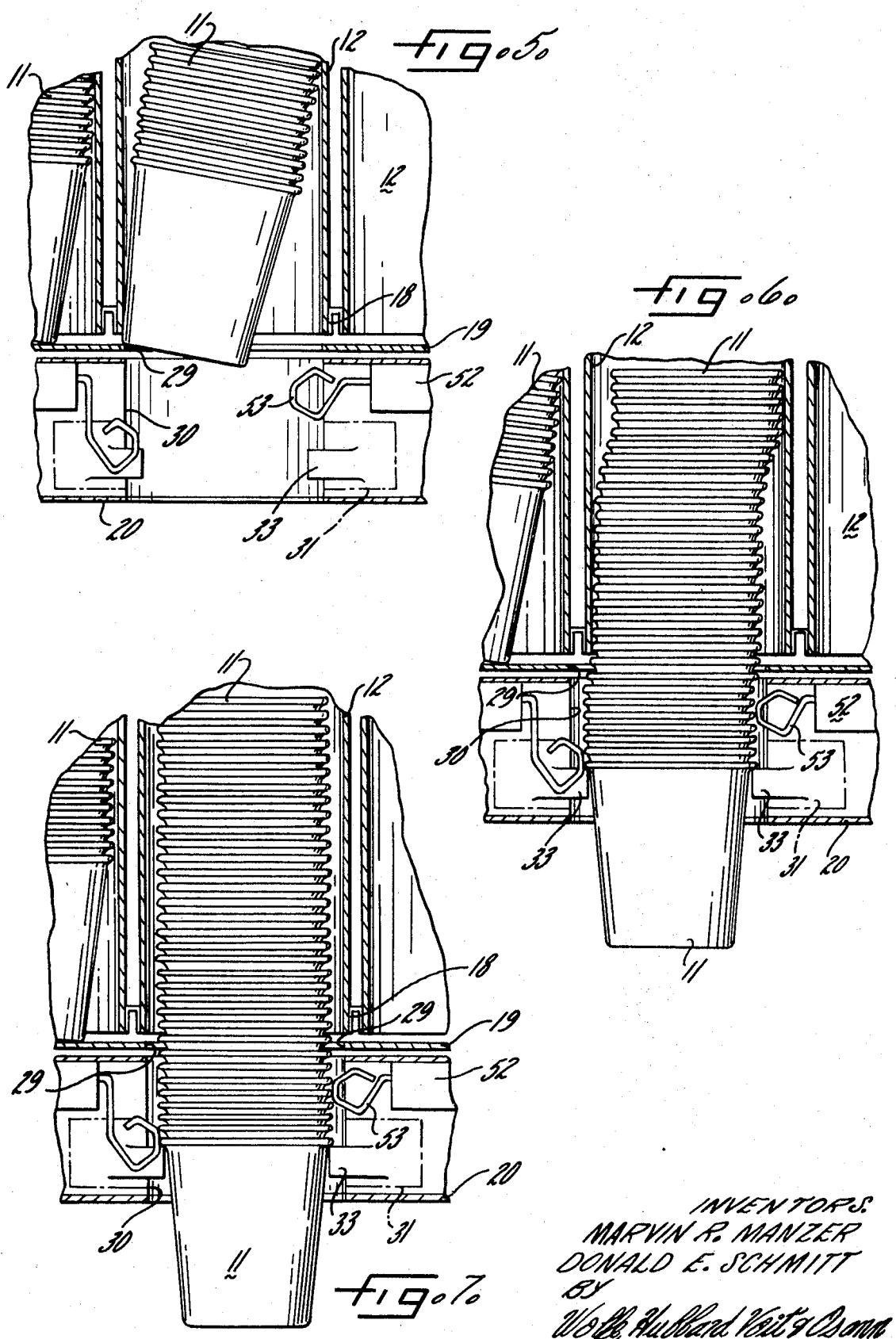

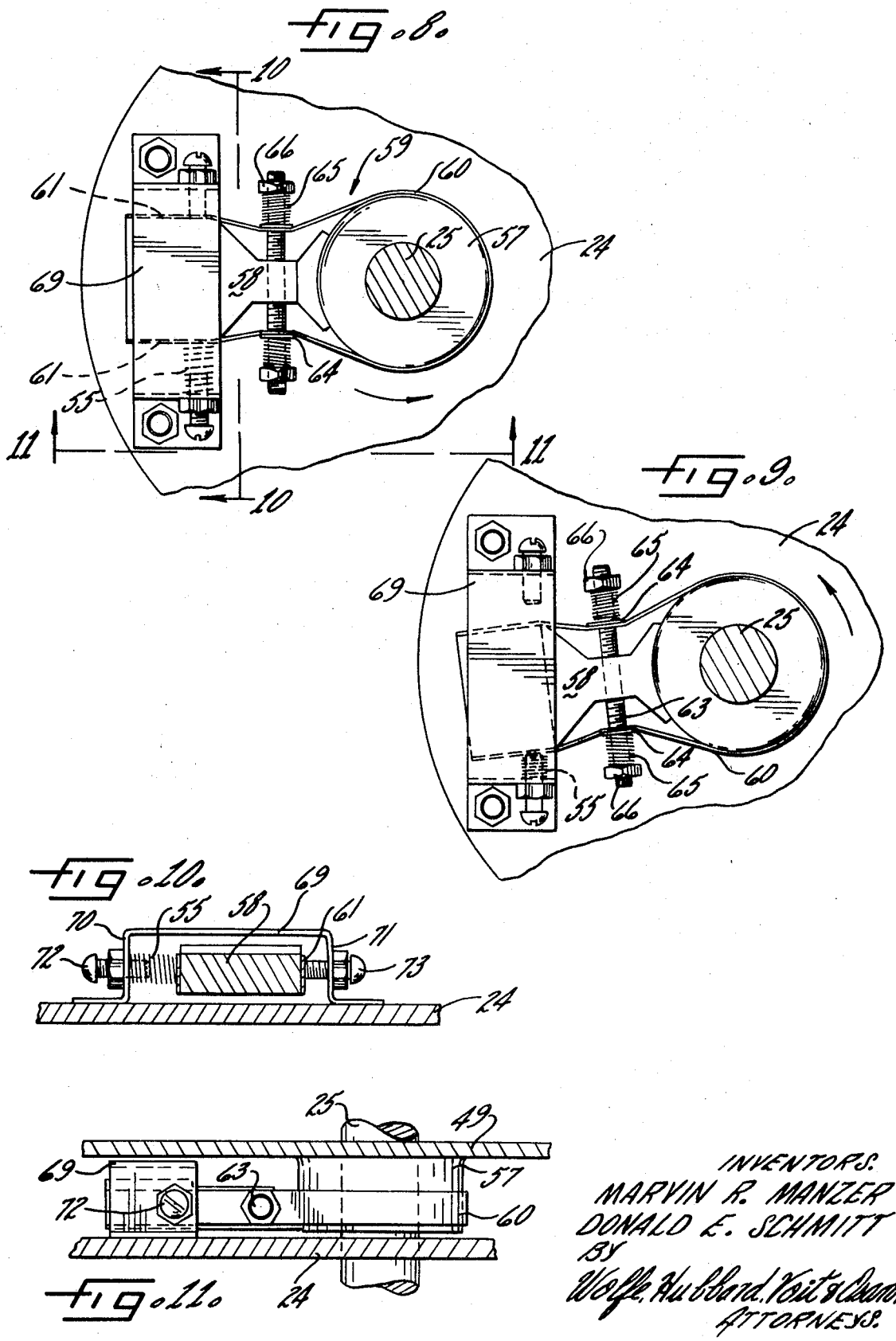

DISPENSING DEVICE WITH ROTATABLE TURRET

BACKGROUND OF THE INVENTION

This invention relates to a device for dispensing stacked articles and more particularly, to a device adapted for use with an automatic vending machine for dispensing stacked food or beverage cups. Typical devices of this type include a rotatable turret which carries a series of angularly spaced holders adapted to store upright stacks of nested cups and operable as an incident to intermittent indexing of the turret to register consecutively with a cup-dispensing opening formed in a base underlying the turret. Each time a holder moves into approximate registry with the dispensing opening, the lowermost cups of the stack in the holder drop downwardly into the opening and are released one-by-one to the vending machine as successive purchases are made to operate the dispenser through successive cycles, the cups in the stack shifting progressively downwardly into the opening each time a cup is released. When the holder is empty, an electric motor indexes the turret automatically through one step to advance another holder in a forward direction into approximate registry with the dispensing opening and to allow the lowermost cups in such holder to drop into the opening. As the turret indexes, the lowermost cup in the holder slides on the base and often causes the cups in the holder to tilt and become vertically misaligned. For this reason, the holder must be advanced partially past the opening to allow the lowermost cups in the holder to drop into the opening. After the cups have dropped, the turret is disconnected from the motor to free the turret to turn in the reverse direction so that the cups remaining in the holder may become aligned with respect to the opening and the cups dropped into the opening.

SUMMARY OF THE INVENTION

It is the primary object of the present invention to provide a dispensing device of the above character in which the turret, after the motor is disconnected therefrom, is turned positively in the reverse direction to more accurately and consistently place the holder in registry with the opening then has been possible heretofore and thereby insure more consistent shifting of the cups stacked in the holder into accurate alignment with the cups stacked in the opening.

It is a more detailed object of the invention to provide a novel and relatively inexpensive backup mechanism which is operable, after the motor is disconnected from the turret, to positively rotate the turret in the reverse direction to back the holder into registry with the opening thus shifting the cups stacked in the holder into accurate alignment with the cups stacked in the opening. The backup mechanism is characterized by a comparatively simple actuator which, as an incident to initial rotation of the turret, is activated to exert a force on the turret tending to rotate the turret in the reverse direction, which, as long as the motor is energized, continues to exert such force without preventing rotation of the turret in the forward direction and which, in response to the disconnection of the motor from the turret, effectively exerts such force on the turret to turn the latter in the reverse direction to place one holder in registry with the dispensing opening thus to shift the cups into alignment.

The invention also resides in the unique arrangement for adjusting the backup mechanism to enable changing of the force exerted on the turret and the distance through which the turret turns in the reverse direction.

Other objects and advantages of the invention will become apparent from the following detailed description taken in connection with the accompanying drawings.

BRIEF DESCRIPTION OF THE DRAWINGS

FIG. 1 is a side elevational view, partly in section, of a cup dispenser embodying the novel features of the present invention.

FIG. 2 is an enlarged, fragmentary cross section taken substantially along the line 2-2 in FIG. 1.

FIG. 3 is a cross section taken substantially along the line 3-3 in FIG. 1.

FIG. 4 is an enlarged, fragmentary cross section taken substantially along the line 4-4 in FIG. 2.

FIG. 5 is an enlarged, fragmentary, cross section taken substantially along the line 5-5 in FIG. 1 and shows one of the holders just prior to the cups dropping into the dispensing opening, the stack of cups being tilted in the holder.

FIG. 6 is a view similar to FIG. 5 but shows the holder advanced partially past the dispensing opening with the lowermost cups having dropped into the opening but with the stack of cups out of alignment.

FIG. 7 is a view similar to FIG. 5 but shows the holder backed up into registry with the dispensing opening and shows the cups in precise alignment.

FIG. 8 is an enlarged, fragmentary cross section taken substantially along the line 8-8 in FIG. 2 and shows the actuator in an unactivated condition.

FIG. 9 is a view similar to FIG. 8 but shows the actuator in an activated condition.

FIG. 10 is a fragmentary cross section taken substantially along the line 10-10 in FIG. 8.

FIG. 11 is a fragmentary cross section taken substantially along the line 11-11 in FIG. 8.

DETAILED DESCRIPTION OF THE PREFERRED EMBODIMENT

As shown in the drawings for purposes of illustration, the invention is embodied in a device 10 (FIG. 1) for dispensing stacked articles from an automatic vending machine (not shown) as an incident to a customer making a purchase by depositing one or more coins. In this particular instance, the articles are lipped cups 11 which are dropped one at a time into the delivery compartment of the vending machine and are filled with various beverages, soups or the like when a purchase is made.

The cup dispenser 10 is housed within the cabinet of the vending machine and includes a series of cupholders in the form of upright tubes 12 each adapted to store a stack of cups 11 in nested relationship. The tubes are carried by and arranged in a circle on a rotatable turret 13 which comprises a lower circular ring 14 and an upper circular ring (not shown) tied together by vertically extending rods 15, a cover 16 being telescoped over the upper ring and being removable to permit loading of cups into the tubes. Being arranged in a circle, the tubes define an upright hollow column between the two rings. As shown most clearly in FIG. 5, the lower ends of the tubes are fitted into holes 18 in the lower ring 14 of the turret and overlie a ringlike cup retaining disc 19 which is fixed stationarily to a supporting base 20 located beneath the turret.

To mount the turret 13 for rotation, two upstanding frame plates 21 (one shown in FIG. 1) project upwardly from a pedestal 22 on the base 20, extend into the column defined by the tubes 12, and are topped by a flat disc 24 which supports a fixed vertical spindle 25. The latter projects upwardly through and is received rotatably in a spider 26 fastened securely to the tie rods 15 and held releasably on the spindle by a locking knob 27 threaded onto the upper end of the spindle. Thus, the turret is mounted to rotate with the spider and to turn about the spindle relative to the base. By taking off the locking knob, the turret may be removed from the spindle and pulled away from the base to permit servicing of mechanism (to be described below) housed within the column defined by the tubes 12. The base is hinged within the cabinet of the vending machine such that the entire dispensing device 10 may be swung outwardly of the cabinet for purposes of servicing the device and filling the tubes with cups 11.

The turret 13 is adapted to be indexed step-by-step about the spindle 25 through steps approximately equal in angular length to the spacing between the tubes 12. Each time the turret dwells, one of the tubes approximately registers with a hole 29 (FIGS. 5, 6, and 7) in the cup retaining disc 19 to allow the lowermost cups 11 of the stack in the registering tube to drop downwardly through the hole and into a cup-dispensing opening 30 formed through the base 20. Escapement mechanism in the cup-dispensing opening catches the dropped cups and then operates through successive cup-dispensing cycles to release the cups one-by-one into the delivery compartment of the vending machine as successive purchases are made, the cups in the tube shifting progressively downwardly into the dispensing opening each time a cup is released. In this instance, the escapement mechanism is identical to that disclosed in U.S. Pat. No. 3,071,292 and includes a ring 31 (FIG. 6) housed within the base and pivotally mounting a series of angularly spaced cams or lugs 33 which project radially into the dispensing opening in underlying relation with the lip of the lowermost cup in the opening. An actuator lever 34 (FIG. 1) is connected operably to the lugs as disclosed fully in the above patent and acts to turn the lugs first away from the cups and then back toward the cups upon being oscillated back and forth when a purchase is made. In this way, the lugs release and drop the lowermost cup in the dispensing opening into the delivery compartment of the vending machine and then return to catch the lip of the next succeeding cup and to hold such cup in the dispensing opening until another purchase is made. The extent to which the lugs project into the dispensing opening may be adjusted within a wide range to enable the dispensing of cups of various types and sizes.

After the last of the cups 11 in the tube 12 registering with the dispensing opening 30 has shifted downwardly into the opening, the turret 13 is indexed automatically through one step in a counterclockwise direction (FIG. 3) to advance the next succeeding tube into registry with the opening and thereby allow the lowermost cups in such tube to drop into the opening into nested relationship with a few cups which remain in the opening. Upon depletion of the cups in the new stack, the turret again is indexed to advance still another loaded tube into registry with the dispensing opening.

An indexing mechanism 35 indexes the turret 13 positively in a forward or counterclockwise direction (FIGS. 3 and 8) to advance a loaded tube 12 sufficiently far to allow the lowermost cups 11 in the advancing tube to drop into the dispensing opening 30. Once the lowermost cups in the advancing tube drop into the opening, the indexing mechanism is disconnected from the turret.

In this specific instance, the indexing mechanism 35 (FIGS. 2 and 4) comprises an electric motor 35a suspended from the underside of the disc 24 and including a frame 36 supporting a stator 37 within which an armature 38 with a drive shaft 39 is both rotatably and slidably telescoped. The exemplary motor is sold by Electro-Counter and Motor Co. of Chicago, Ill. as Model D1-M1 and includes a field winding (not shown) which surrounds the armature and which, when excited upon energization of the motor, is operable not only to rotate the armature but also to shift the armature upwardly in an axial direction within the stator. When the motor is deenergized, the armature is pulled downwardly within the stator by gravity and its rotation is arrested by a friction disc 40 which is located on the motor frame 36 to engage and rub against the lower end of the armature.

To releasably connect the index motor 35a with the turret 13, a coupling 41 is formed by the input gear of a train of reduction gears 42 (FIGS. 2 and 4) within a gear box 43 on the underside of the disc 24, and by a drive element in the form of a splined upper end 44 of the motor drive shaft 45. When the motor is energized and the armature 38 is shifted upwardly within the stator 37, the splined end 44 of the shaft meshes with and drives the input gear of the gearing 42 to turn an output shaft 46 (FIG. 2) projecting upwardly from the gear box 43 through the disc 24 and carrying a pinion 48 which meshes with a gear 49 rotatably mounted on the spindle 25. A drive pin 50 projecting upwardly from the upper side of the gear 49 is bushed in the spider 26 and serves to index the turret positively when the gear is turned as an incident to energization of the index motor. When the motor is deenergized to permit the armature to drop downwardly within the stator, the splined end 44 of the drive shaft 45 shifts downwardly out of meshing engagement with the gearing 42 to allow the latter to freewheel with respect to the motor and thus to permit the turret to turn in either direction without being retarded by the motor.

Energization and deenergization of the turret index motor 35a is controlled by detecting means in the form of a switch 52 (FIGS. 5, 6, and 7) operable to sense the cups 11 in the dispensing opening 30 and to produce a signal energizing the index motor after any particular tube 12 registering with the opening has been emptied of cups. As shown in FIGS. 5 to 7, the index switch is mounted within the base 20 and includes a wire actuator 53 which is spring-urged into the dispensing opening. As long as the wire actuator engages cups in the opening, the switch is held open to keep the index motor deenergized. After the registering tube has been emptied and only a few (e.g., three) cups remain in the dispensing opening, the actuator, being located above the remaining cups, is permitted to shift inwardly into the opening (to the position shown in FIG. 5) to close the switch. Closure of the switch energizes the motor to index a new stack of cups into registry with the dispensing opening. When the lowermost cups of the new stack drop into the opening, the actuator again is forced outwardly to open the switch and produce a second signal deenergizing the motor.

As the turret is advanced, the lowermost cup 11 in each tube 12 is dragged along the cup retaining disc 19 due to the frictional engagement between the cup and the disc. As best shown in FIG. 5, this dragging normally causes the stack of cups in the tube advancing toward the dispensing opening 30 to tilt such that the lowermost cup becomes positioned against the trailing wall portion of the tube. As a result, the tube must be indexed partially past the dispensing opening 30 as shown in FIG. 6 so that the stack of cups can advance sufficiently far to drop into the opening. When the cups drop from this tilted position, the cups remaining in the tube usually are skewed, as shown in FIG. 6 with respect to the cups in the opening.

In accordance with the present invention, the turret 13 is power rotated in the reverse direction (clockwise in FIG. 3), once the motor 35a has been deenergized and the armature 38 shifted downwardly to disconnect the motor from the turret, thereby to back the unloading tube 12 into exact registry with the dispensing opening 30 and to shift the cups 11 stacked in the tube into accurate alignment (FIG. 7) with the cups stacked in the opening. To these ends, a backup mechanism 54 (FIG. 3) is connected to the turret and comprises an actuator 55 (FIG. 8) which is activated, as an incident to the initial forward rotation (counterclockwise in FIG. 8) of the turret, to exert reversing force or torque on the turret tending to rotate the turret in the reverse direction (clockwise). The backup mechanism is connected to the turret in such a manner that, as long as the motor is energized, the reversing torque is exerted without preventing forward rotation of the turret. Finally, in response to the deenergization of the motor and release of the coupling 41, the backup mechanism operates to effectively exert the force of the actuator on the turret to turn the latter in the reverse direction thus backing the unloading tube into registry with the dispensing opening and shifting the cups in the tube into alignment with one another and those in the opening 30 so that the cups may be dispensed without jamming or hanging up.

Herein, the backup mechanism 54 is connected between the turret 13 and the flat disc 24 with the actuator 55 being mounted stationarily on the flat disc. To connect the mechanism with the turret, a cylindrical shaft or boss 57 is rigid with and extends downwardly from the underside of the gear 49 for rotation with the gear and also with the spider 26 and the turret. As shown in FIG. 8, the boss is telescoped over and concentric with the spindle 25. The backup mechanism comprises, in addition to the actuator, an arm 58 which extends between the boss and the actuator, and a connection 59 which joins the arm to the boss. In operation, the connection is operable, during initial counterclockwise rotation of the turret and thus the boss, to clamp the arm to the boss for rotation therewith. This rotation presses the outer end portion of the arm against the actuator to activate the latter to exert a clockwise force on the arm. When the force reaches a predetermined level, the connection is operable to allow the boss to rotate relative to the arm as the turret is indexed. In response to deenergization of the motor 35a and release of the coupling 41, the connection is effective to clamp the arm to the boss so that the force of the actuator swings the arm clockwise and rotates the boss to rotate the turret clockwise thus backing the unloading tube 12 into registry with the dispensing opening 30.

To fit against the boss 57, the inner end of the arm 58 is formed with a concave shape having a radius generally equal to that of the boss. The arm tapers inwardly and then back out along its length and is formed with a relatively wide outer end portion. In this instance, the connection 59 is formed by a thin metal band 60 (FIG. 8) which is wrapped partially around the boss and fastened at opposite ends 61 to the sides of the outer end portion of the arm. The frictional engagement of the band with the boss joins the arm to the boss for turning therewith during initial rotation of the turret as the latter is indexed counterclockwise. Such turning of the arm forces the outer end portion of the arm against the actuator 55 which is thus actuated to exert a force against the arm. When such force reaches a predetermined level, the frictional engagement of the band with the boss is overcome to cause the band to slip on the boss thus allowing the arm to remain stationary as the boss continues to rotate, the sliding friction of the band on the boss balancing the force exerted by the actuator on the arm. When the motor 35a is deenergized as a result of the lowermost cups 11 dropping into the dispensing opening 30, the power rotation of the boss 57 in a counterclockwise direction ceases, and the frictional engagement between the band and the boss is reestablished so that the force exerted by the actuator against the outer end portion of the arm swings the arm clockwise to rotate the boss clockwise thus backing up the turret 13.

The band 60 may be adjustably tensioned to selectively vary the amount of force necessary to break the frictional engagement between the band and the boss 57. For this purpose, a threaded shaft 63 extends through the narrow central portion of the arm 58 and through the band portions on both sides of the arm, the band being spaced from the narrow portion. Washers 64 are telescoped over the outer end portions of the shaft and bear against the band portions. Coil springs 65 are telescoped over the outer end portions of the shaft and are compressed between the washers and nuts 66 threaded on the shafts. The tension on the band and thus the gripping effect of the band on the boss due to friction can be adjusted by turning the nuts to increase or decrease the load on the springs.

In this instance, the actuator 55 is a coiled compression spring mounted in a cage 69 fixed to the upper surface of flat disc 24. As shown in FIG. 10, the cage is formed as a generally inverted U-shaped bracket with parallel, spaced-apart side members or walls 70 and 71. A screw 72 extends through the left wall 70 (FIG. 10), and the spring is telescoped over the inner end portion of the screw. In its relaxed state, the spring extends from the wall inwardly beyond the inner end of the screw. The outer end portion of the arm 58 extends into the cage and, during initial rotation of the turret 13, the arm presses against the inner end of the spring to compress the latter. The spring compresses, building up force, until the arm contacts the inner end of the screw. When this occurs, the band 60 slips on the boss 57 to allow the turret to continue to rotate. Upon deenergization of the motor 35a the spring relaxes thus forcing the arm, which is again joined to the boss for rotation therewith, to swing clockwise to power rotate the turret reversely or clockwise. The amount of spring force that is built up by compressing the spring can be adjusted by varying the distance that the end portion of the screw 72 projects through the wall 70, the spring force building up until the arm contacts the screw. The amount of spring force built up determines the speed with which the turret is backed up and the weight of turret which may be used.

The distance the arm 58 can swing clockwise under the force of the spring 55 may be adjusted to control the distance that the turret 13 is backed up. For this purpose, a second screw 73 projects inwardly through the wall 71 of the cage 69, and the inner end of the second screw 73 is spaced from and opposes the inner end of the screw 72. The outer end portion of the arm is positioned between the two screws, and the inner end of the second screw defines the limit of clockwise travel of the arm. The distance the arm can travel is controlled by the distance the inner ends of the two screws are spaced-apart. Turning of the second screw 73 alone will adjust the travel of the arm. If the extent to which the spring is to be compressed is to be adjusted but the travel of the arm is to remain the same, the two screws must be turned to move the inner ends by the same amount in the same direction, i.e., left or right in FIG. 10.

It will be observed that the provision of the backup mechanism 54 to positively rotate the turret 13 in an angular direction opposite that which the turret turns through during indexing is particularly advantageous. The turret is rotated counterclockwise (FIG. 3) to move the unloading tube 12 toward and then partially past the dispensing opening 30 to drop the lowermost cups 11 of the stack of cups in the tube into the opening thus deenergizing the motor 35a. The backup mechanism then operates to rotate the turret clockwise to turn the tube back into exact registry with the dispensing opening and shift the cups to vertically align the cups stacked in the tube with one another and with those stacked in the opening.

The backup mechanism is comparatively simple and inexpensive in construction and trouble-free in service use and, in addition, may be easily adjusted to vary the backup torque exerted on the turret and to change the distance through which the turret is turned reversely.

We claim as our invention:

1. In a cup dispenser, the combination of, a base having a cup dispensing opening extending downwardly therethrough, a turret disposed above and rotatable relative to said base and carrying a series of downwardly opening holders for storing upright stacks of nested cups, the holders being spaced angularly from one another and being positioned to register successively with said dispensing opening as an incident to rotation of said turret so that the lowermost cups of the stack in each holder drop into the opening for subsequent dispensing when such holder moves into approximate registry with the opening, an indexing motor, a releasable coupling between said motor and said turret and operable when engaged to rotate the latter in a forward direction to advance one of the holders toward and then partially past the dispensing opening in response to energization of the motor to allow the lowermost cups in said one holder to drop into said opening, detecting means operable to produce a signal as an incident to the lowermost cups of the one holder dropping into said opening, means responsive to said signal for releasing said coupling to allow said turret to turn freely relative to said motor, and mechanism connected to the turret and operable after release of said coupling to positively rotate the turret in the reverse direction through a sufficient angular distance to back the one holder into registry with said opening whereby the cups stacked in the one holder are shifted into accurate alignment with the cups stacked in the opening.

2. The cup dispenser of claim 1 in which said mechanism includes an actuator which, as an incident to initial rotation of the turret in said forward direction, is activated to exert on the turret a force tending to rotate the turret in the reverse direction and which, as long as the motor is energized, continues to exert such force without preventing rotation of the turret in said forward direction, said actuator in response to releasing of said coupling, effectively exerting said force on said turret to turn the latter in said reverse direction to place said one holder in registry with said opening.

3. The cup dispenser of claim 2 in which said actuator comprises a spring which is loaded a predetermined amount to exert said force as an incident of initial rotation of said turret in said forward direction and which relaxes upon release of said coupling and effectively exerts said force on said turret to turn said turret in said reverse direction.

4. The cup dispenser of claim 3 in which said actuator further includes a spring holder mounted stationarily on said base with said spring being mounted on said holder, and means connected to said turret for loading said spring and pressing the latter against said holder during initial forward rotation of said turret, a connection between said loading means and said turret and operable during initial rotation of said turret to grip said turret so that said loading means turns with said turret, operable after said spring is loaded to slip with respect to said turret thus allowing said turret to rotate with respect to said loading means, and then operable to grip said turret when said coupling is released so that, as said spring relaxes, said turret is rotated in said reverse direction into registry with said opening.

5. The cup dispenser of claim 4 in which said turret includes a shaft which rotates with the turret, said loading means being an arm extending between said shaft and said spring holder, and said connection includes a flexible band wrapped around said shaft and connected to said arm, and means for tensioning said band to hold the latter in frictional engagement against said shaft to force said arm to turn with said shaft until said spring is loaded said predetermined amount, such frictional engagement thereafter being overcome to allow said shaft to turn relative to said band and said arm, and said band reestablishing such frictional engagement when said coupling is released so that said turret is rotated in said reverse direction as said spring relaxes.

6. The cup dispenser of claim 5 in which said spring is a compression spring, said spring holder including a wall, a screw threaded through said wall with an end portion thereof extending beyond said wall, said spring being telescoped over said end portion with one end bearing against said wall and with the other end extending beyond the end of said screw when said spring is relaxed, said arm swinging toward said wall during initial rotation of said turret until contacting said screw to compress said spring between said wall and said arm to load the spring, and the distance said end portion extends into said housing being selectively adjustable by turning said screw whereby the load on said spring may be selectively changed.

7. The cup dispenser of claim 6 further including a second wall spaced from said first wall with one end portion of the arm disposed between said walls and with said spring disposed between said walls, a second screw extending through said second wall with an end portion extending toward said first wall so that the extent of travel of said arm and thus said turret in said reverse direction is controlled by the distance between the adjacent ends of said screws.

8. The cup dispenser of claim 1 in which said mechanism comprises a spring which, as an incident to initial rotation of the turret in said forward direction, is loaded and exerts a force on the turret tending to rotate the latter in the reverse direction and which, as long as the coupling is engaged and the motor energized, continues to exert such force without preventing rotation of the turret in said forward direction, said spring, in response to releasing of said coupling, effectively exerting said force on said turret to turn the latter in said reverse direction to place said one holder in registry with said opening.

9. A cup dispenser comprising a base having a cup dispensing opening extending downwardly therethrough, a turret disposed above and rotatably mounted on said base and carrying a series of downwardly opening holders for storing upright stacks of nested cups, the holders being spaced angularly from one another and being positioned to register successively with said dispensing opening as an incident to rotation of said turret so that the lowermost cups of the stack in each holder drop into the opening for subsequent dispensing when such holder moves into approximate registry with the opening, an indexing motor, a releasable coupling between said motor and said turret and operable when engaged to rotate the latter in a forward direction to advance one of the holders toward and then partially past the dispensing opening in response to energization of the motor to allow the lowermost cups in said one holder to drop into said opening, detecting means operable to produce a signal as an incident of the lowermost cups of one holder dropping into said opening, means responsive to said signal for releasing said coupling to allow said turret to turn freely relative to said motor, the improvement in said cup dispenser comprising, a shaft connected to said turret for rotation therewith, a member mounted stationarily on said base, an arm extending between said shaft and said member with one end portion of said arm opposing said member, a compression spring disposed between said member and said one end portion of said arm, means connecting said arm to said shaft for turning with said shaft during initial rotation of said turret in said forward direction to press said arm against said spring and load the latter a predetermined amount to exert a force on said turret tending to rotate the turret in the reverse direction, said connecting means being operable, after said spring is loaded said predetermined amount and as long as said motor is energized and said coupling is connected, to allow said shaft to turn relative to said arm, said connecting means being operable in response to release of said coupling to reconnect said arm to said shaft for turning therewith, and said spring relaxing as an incident to release of said coupling to turn said arm and said shaft in said reverse direction to positively rotate said turret in said reverse direction through through a sufficient angular distance to back the one holder into registry with said opening whereby the cups stacked in the one holder are shifted into accurate alignment with the cups stacked in the opening.

10. The cup dispenser of claim 9 in which said spring is a compression spring, a screw threaded through said member with an end portion extending past said member and toward said arm, said spring being telescoped over said end portion with one end bearing against said member and with the other end extending beyond the end to said screw when said spring is relaxed, said arm swinging toward said member during initial rotation of said turret until contacting said screw to compress said spring between said member and said arm to load the spring, and the distance said end portion extends past said member being selectively adjustable whereby the predetermined load on said spring may be selectively changed.

11. The cup dispenser of claim 10 further including a second stationary member spaced from said first member, said spring and said one end portion of the arm being disposed between said members, a second screw extending through said second member with an end portion extending toward said first member and toward said one end portion of said arm so that the extend of travel of said arm and thus said turret in said reverse direction is controlled by the distance between the adjacent ends of said two screws.

12. The cup dispenser of claim 9 in which said connecting means includes a band wrapped around said shaft and connected to said arm, and means for tensioning said band so that said band is held in frictional engagement against said shaft to force said arm to turn with said shaft until said spring is loaded said predetermined amount, such frictional engagement thereafter being overcome to allow said shaft to turn relative to said band, and said band reestablishing such frictional engagement when said coupling is released so that said turret is rotated in said reverse direction as said spring relaxes.